United States Patent [19]

Panzer et al.

[11] 4,217,215

[45] Aug. 12, 1980

[54] PROCESS FOR FLOCCULATION USING CROSSLINKED POLYSULFONIUM COMPOUNDS

[75] Inventors: Hans P. Panzer, Stamford; Anthony T. Coscia, Norwalk; Albert G. Robustelli, Darien, all of Conn.

[73] Assignee: American Cyanamid Company, Stamford, Conn.

[21] Appl. No.: 4,641

[22] Filed: Jan. 19, 1979

[51] Int. Cl.$^2$ .................. B01D 21/01; C02B 1/20
[52] U.S. Cl. .................................................. 210/54
[58] Field of Search ............ 210/10, 42 R, 47, 52–54; 528/373, 374

[56] References Cited

U.S. PATENT DOCUMENTS

| 2,518,245 | 8/1950 | Morris et al. | 528/373 |
| 3,280,081 | 10/1966 | LaCombe et al. | 210/54 |
| 3,821,306 | 6/1974 | Farber | 210/54 |

FOREIGN PATENT DOCUMENTS 1062014  7/1959  Fed. Rep. of Germany.

*Primary Examiner*—Charles N. Hart
*Assistant Examiner*—Peter A. Hruskoci
*Attorney, Agent, or Firm*—William J. vanLoo; Paul W. Leuzzi, II

[57] ABSTRACT

Water-soluble cross-linked cationic polysulfonium derivatives of poly(thiodiethanol)ethers are useful flocculants for suspended solids in aqueous medium.

5 Claims, No Drawings

PROCESS FOR FLOCCULATION USING CROSSLINKED POLYSULFONIUM COMPOUNDS

CROSS-REFERENCE TO RELATED APPLICATIONS

This application is related to copending application Ser. No. 4,642 filed on Jan. 19, 1979. The instant application relates to a process of flocculation using water-soluble cross-linked cationic polysulfonium derivatives of poly(thiodiethanol) ethers and the related application relates to the polysulfonium derivatives and a method of preparation thereof.

This invention relates to a process for flocculating aqueous suspensions of solid materials. More particularly, this invention relates to such a process wherein the flocculating agent employed is a water-soluble cross-linked cationic polysulfonium derivative of a poly(thiodiethanol)ether.

Cationic polymers that are water-soluble are useful in a variety of applications in which their cationicity is advantageous. Many of these cationic polymers obtain their cationicity by virtue of a nitrogen atom in the polymer molecule, the strongest charge being exhibited by quaternary ammonium groups in the nitrogen series. These cationic polymers are effective flocculants for suspended particles and are used in applications involving river-water clarification and settling of solids in municipal and industrial wastes, iron ore slimes, fine coal slurries, enzyme mashes, and the like.

Many of the applications of cationic flocculants involve suspensions that are chlorinated. The chlorine present in these chlorinated suspensions adversely affects the performance of amine polymers that are degraded by chlorine rendering them ineffective in the use contemplated. Cationic polymers that are effective flocculants in applications involving chlorine are limited in number and are generally difficult and expensive to provide. In addition, suitable amines for preparing cationic polymers are becoming short in supply with a resulting increase in cost. Consequently, there is need for processes for flocculating aqueous suspension of solid particles which are effective in the presence of chlorine and employ flocculants readily prepared from economic starting materials that are in abundant supply. The provision for such processes would satisfy a long-felt need and constitute a significant advance in the art.

In accordance with the present invention there is provided a process for flocculating aqueous suspensions of solids which comprises adding thereto an effective amount of a cationic water-soluble cross-linked polymer containing repeating units of the structure:

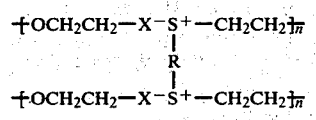

as the cationic portion wherein R is the radical derived from a sulfide-reactive difunctional alkylating agent and n is a value such that the molecular weight of the repeating units does not exceed about 30,000 and $X^-$ is an anion neutralizing a cationic charge and providing a water-soluble polymer.

The polymers used in the process of the present invention are water-soluble and effective flocculants in applications involving chlorine as well as in applications wherein chlorine is not involved. The polymers are free of amine cationicity and thus offer effective alternatives to amine usage.

The polymers used in the present invention are readily prepared by suitable chemical modification of poly(thiodiethanol) ethers and are based on economic starting materials. Thiodiethanol is prepared by reaction of hydrogen sulfide and ehtylene oxide. Poly(thiodiethanol)ethers may be prepared by a number of techniques including those described in U.S. Pat. No. 2,518,245 or German Pat. Nos. 880,485; 959,948; 1,005,275; 1,026,072; and 1,039,232, for example.

Poly(sulfoniumdiethanol)ether salts are described in German Pat. No. 1,062,014. These polymers, however, are not cross-linked and are made by reaction of a monofunctional alkylating agent with the sulfide linkage of the repeating thiodiethanol unit. These products are not described as flocculating agents but are used as dye assistants or as surface active agents.

In preparing the polysulfonium compounds used in the present invention, a poly(thiodiethanol)ether is reacted with a suitable quantity of a sulfide-reactive difunctional alkylating agent to provide a cross-linked polymer containing sulfonium linkages at the points of cross-linking, the extent of cross-linking being such that the resulting polymer retains its water-solubility. As indicated, the instant polymers derive their cationicity from sulfonium ions and are highly effective flocculants. Suitable sulfide reactive difunctional alkylating agents include, for example, 1,4-dichloro-2-butene, epichlorohydrin, ethylene dichloride, epibromohydrin, and the like as well as mixtures thereof.

Suitable poly(thiodiethanol)ethers are those prepared by heating thiodiethanol in the presence of a suitable etherification catalyst, such as phosphoric acids or derivatives thereof. Additional molecular weight build-ups may be achieved by reacting with a difunctional extending agent such as phosgene.

To prepare a cross-linked water-soluble polysulfonium derivatives of the poly(thiodiethanol)ethers, the sulfide reactive difunctional alkylating agent and ether are contacted under reactive conditions. Contact may be effected in aqueous suspension, in organic solvents, or in the melt at moderately elevated temperatures, for example, 30°–100° C. The reaction mixture may be buffered with sodium bicarbonate, sodium carbonate, sodium hydroxide solution or other suitable bases to facilitate reaction. It is generally preferred to carry out the reaction with a polymer melt and alkylating agent dispersed therein while incrementally infusing water into the reaction mixture to dissolve the desired reaction product as it forms.

In preparing the cross-linked water-soluble polysulfonium derivatives of the poly(thiodiethanol)ethers, it is necessary to employ as starting materials poly(thiodiethanol) ethers having molecular weight values below about 20,000. Higher molecular weight values lead to gelled and water-insoluble polymers. Even within the molecular weight range indicated, water-insoluble or poor performing polymers will result if preparation conditions are not properly controlled. Generally, best performance is obtained when preparation is conducted at 40°–60° C. With epichlorohydrin, polymer solids of about 20–30% with incremental addition of water to provide this content appears to offer best performance. With the dihalide alkylating agents, best performance appears to occur at polymer solids of 10% and water-soluble polymers are not obtained at molecular weight values of the poly(thiodiethanol)ethers of 30,000. With epichlorohydrin, although water-soluble polymers are obtained at molecular weights of 30,000, the polymers resulting are poor in performance.

In carrying out the process of the present invention, an effective amount of flocculant as described is added to the aqueous suspension of solids and the desired flocculation will occur. Addition and dosage will follow conventional procedures except for choice of flocculant. Usually addition is conducted in association with mixing such as occurs in transferring the suspension to a settling tank and no special step of mixing is necessary. However, when addition is made to a suspension that would otherwise remain undisturbed, mixing should be effected to provide uniform distribution of flocculant throughout the suspension. Although the dosage of flocculant will vary widely, depending upon the nature of the suspension being treated, the effective dosages will be within conventional usage for the particular type of suspension being treated. Usually amounts from about 0.1 to 100 parts of flocculant or more per million parts of suspension solids are effective.

The invention is fully illustrated in the examples which follow wherein all parts and percentages are by weight unless otherwise specified.

EXAMPLE 1

Into a 100 milliliter round-bottom reaction flask equipped with condenser, stirrer, and thermometer were placed 10 grams (0.0961 mole) of a poly(thiodiethanol)ether of molecular weight 4,000. The flask was immersed in an oil bath maintained at 50° C. and the polymer melted in −5 minutes. With stirring 10.8 grams (0.1167 mole) of epichlorohydrin were added. The mixture was stirred at 50° C. until uniform (about 5 minutes). Water was added using an infusion pump until a solids content of 25% was obtained, about 6.5 hours. The resulting polysulfonium derivative had an intrinsic viscosity in aqueous 1 molar NaCl at 25° C. of 0.08 and a charge density of greater than 60%. The solution pH was 7.5–8.0.

EXAMPLE 2

Using the procedure described in Example 1, 5.0 grams (0.048 mole) of the same polymer was placed in the flask. After melting the polymer, 3.0 grams (0.024 mole) of 1,4-dichloro-2-butene was added. After mixing until uniform, water was added using an infusion pump over a 3-hour period until a solids content of 7.5% was obtained. After the addition of the water, the reaction was continued for an additional 4½ hours. The intrinsic viscosity was 0.16 and the cationic charge was greater than 60%. The pH of the solution was 2.5.

EXAMPLE 3

In order to assess the flocculation performance of the polysulfonium compounds prepared in Examples 1 and 2, tests were performed using Bentonite Simulated Raw Water (BSRW) jar tests, a conventional test procedure. In this test, the dosage of flocculant required to reduce the turbidity of the BSRW to 20% of its original value relative to that of a typical polyquaternary ammonium compound which is an important article of commerce. This polyquaternary is a high molecular weight polymer obtained by reaction of dimethylamine, epichlorohydrin and a small quantity of a polyamine and is arbitrarily assigned a relative dosage value $RD_{20}$ of 1.0. The results obtained are given in Table I which follows:

Table I

| RELATIVE DOSAGE REQUIREMENTS FOR 20% RESIDUAL TURBIDITY | |
|---|---|
| Flocculant | $RD_{20}$ |
| Polyquaternary Amine | 1.0 |
| Example 1 | 1.15 |
| Example 2 | 1.0 |

These results show that the polysulfonium compounds used in the present invention are substantially equivalent in performance in water clarification to the commercial polyquaternary amine in spite of the fact that the instant polymers contain no amine groups.

COMPARATIVE EXAMPLE A

Following the procedure of Example 1, 5.0 grams (0.048 mole) of the same poly(thiodiethanol)ether was added to the flask. There were also added an equal molar quantity of dimethylsulfate (6.0 gms.) and 25 grams of $H_2O$. The reaction was conducted for 7 hours at 21° C. The pH after reaction was 1.2 and this was adjusted to 7.0 using dilute aqueous NaOH.

COMPARATIVE EXAMPLE B

The polysulfonium compound of Comparative Example A, which was not a cross-linked polymer, was evaluated as in Example 3. The relative dosage $RD_{20}=10.0$. This result shows that the uncrosslinked polysulfonium compounds must be used at very high dosages to equal the cross-linked polysulfonium compounds in performance.

EXAMPLES 4 and 5

Following the procedures of Examples 1 and 3, a series of polysulfonium compounds were prepared and evaluated. In each preparation epichlorohydrin (EPI) was used as the difunctional alkylating agent. Certain preparations falling outside the scope of the present invention are indicated as comparative examples. Details and results are given in Table II which follows.

EXAMPLES 6–8

Again, following the procedures of Examples 1 and 3, a series of polysulfonium compounds were prepared and evaluated using 1,4-dichloro-2-butene (DCB) as the difunctional alkylating agent. Certain preparations falling outside the scope of the present invention are indicated as comparative examples. Details and results are given in Table III which follows.

TABLE II

POLSULFONIUM DERIVATIVES OBTAINED WITH EPICHLOROHYDRIN (EPI)

| Ex. No. | Poly(Thiodiethanol)Ether Mol. Weight | Mole | EPI Mole | Reaction Cycle | Solids (%) | $RD_{20}$ |
|---|---|---|---|---|---|---|
| 4 | 4,000 | 1.0 | 1.0 | 7 hours 50° C. | 25 | 1.2 |
| 5 | 4,000 | 1.0 | 1.0 | 16 hours 40° C. | 25 | 2.2 |
| Comp. C | 11,000 | 1.0 | 1.0 | 6 hours 50° C. | 20 | 3.2 |
| Comp. D | 30,000 | 1.0 | 1.0 | 8 hours 50° C. | 30 | gel. |
| Comp. E | 30,000 | 1.0 | 1.0 | 3 hours 60° C. | 10 | 3.65 |

TABLE III

POLYSULFONIUM DERIVATIVES OBTAINED WITH 1,4-DICHLORO-2-BUTENE

| Ex. No. | Poly(Thiodiethanol)Ether Mol-Weight | Mole | DC3 Mole | Reaction Cycle | Solids (%) | $RD_{20}$ |
|---|---|---|---|---|---|---|
| 6 | 4,000 | 2.0 | 1.0 | 7 hours 50° C. | 10 | 1.1 |
| 7 | 11,000 | 2.0 | 1.0 | 3 hours 70° C. | 5 | 1.3 |
| 8 | 11,000 | 2.0 | 1.0 | 7 hours 50° C. | 5 | 1.2 |
| Comp. F | 30,000 | 2.0 | 1.0 | 5 hours 50° C. | 10 | gel |
| Comp. G | 30,000 | 2.0 | 1.0 | 3 hours 60° C. | 10 | gel |

We claim:

1. A process for flocculating aqueous suspension of solids which comprises adding thereto an effective amount of a cationic water-soluble cross-linked polymer containing repeating units of the structure:

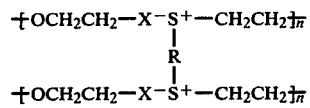

wherein R is a radical derived from a sulfide-reactive difunctional alkylating agent and n is a value such that the molecular weight of the repeating units is up to about 30,000 and wherein $X^-$ is an anion neutralizing a cationic charge of the polymer and providing a water-soluble polymer.

2. The process of claim 1 wherein said R is the radical derived from 1,4-dichloro-2-butene.

3. The process of claim 1 wherein said R is the radical derived from epichlorohydrin.

4. The process of claim 1 wherein said polymer has a charge density of at least 60%.

5. The process of claim 1 wherein said polymer has a charge density of at least 75%.